United States Patent [19]

Bruder

[11] Patent Number: 5,047,899

[45] Date of Patent: Sep. 10, 1991

[54] SOLID ELECTROLYTE CAPACITOR AND METHOD OF MAKING

[75] Inventor: John F. Bruder, Phoenix, Ariz.

[73] Assignee: Quadri Electronics Corporation, Chandler, Ariz.

[21] Appl. No.: 562,234

[22] Filed: Aug. 3, 1990

[51] Int. Cl.$^5$ .............................................. H01G 9/00
[52] U.S. Cl. .................................... 361/502; 29/25.03
[58] Field of Search ............... 361/502, 508, 509, 523, 361/528, 516, 529, 532, 434; 429/191; 29/25.03

[56] References Cited

U.S. PATENT DOCUMENTS

| | | | |
|---|---|---|---|
| 3,443,997 | 5/1969 | Argoe et al. | 136/83 |
| 3,476,605 | 11/1969 | Owens | 136/83 |
| 3,476,606 | 11/1969 | Owens | 136/83 |
| 3,503,810 | 3/1970 | Grocs | 136/120 |
| 3,597,822 | 8/1971 | Fehlner | 29/183.5 |
| 3,647,549 | 3/1972 | Christie et al. | 136/83 |
| 3,663,299 | 5/1972 | Owens et al. | 136/83 |
| 3,701,685 | 10/1972 | Ervin, III | 136/83 |
| 4,141,719 | 2/1979 | Hakko | 75/0.5 BB |
| 4,965,151 | 10/1990 | Takada et al. | 429/191 |

OTHER PUBLICATIONS

"Applications of Halogenide Solid Electrolytes", by B. B. Owens, J. E. Oxley, and A. F. Sammells, pp. 67–104.
"A Solid State Electrochemical Capacitor", by J. E. Oxley, Abstract No. 175, pp. 446–447.
"Solid State Energy Storage Device", by J. E. Oxley, Session on Secondary Batteries, pp. 20–23.
"Solid Electrolyte Batteries", by B. B. Owens, pp. 28–30.

Primary Examiner—Donald A. Griffin
Attorney, Agent, or Firm—Cahill, Sutton & Thomas

[57] ABSTRACT

A technique is disclosed for supplying backup power by providing a solid-state electrochemical capacitor with a layer of solid electrolyte material composed of RbAg$_4$I$_5$, a layer of anode material composed of carbon and RbAg$_4$I$_5$ adjoining a first surface of the electrolyte material, and a layer of cathode material composed of carbon and RbAg$_4$I$_5$ adjoining a second surface of the electrolyte material. A current is supplied to charge the anode of the capacitor structure to a voltage in the range from 0.50 volts to 0.66 volts to cause storage of charge in the capacitor structure in both a double layer capacitance mode and a pseudo capacitance mode. The charged up capacitor is used to supply a backup voltage to a CMOS memory. The capacitor structure is made by compressing the electrolyte, the anode, and the cathode together to produce molecular bonding without binder material, using compression forces of approximately 80,000 psi. Refractory metal contacts coupling the anode and cathode to a charging circuit and a discharging circuit.

26 Claims, 3 Drawing Sheets

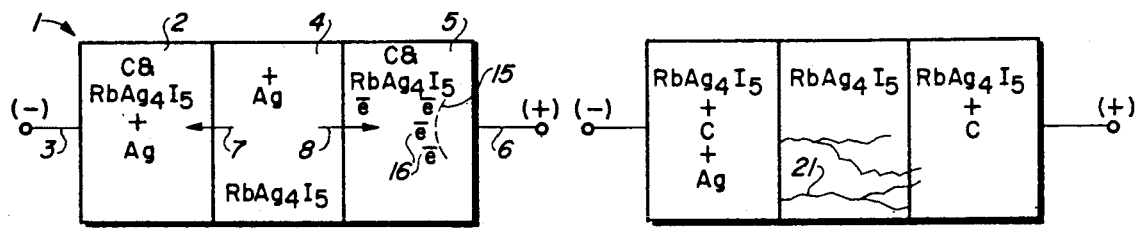
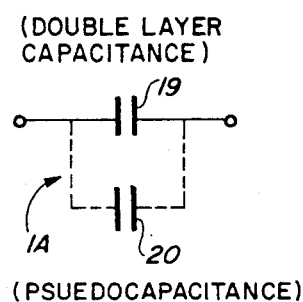
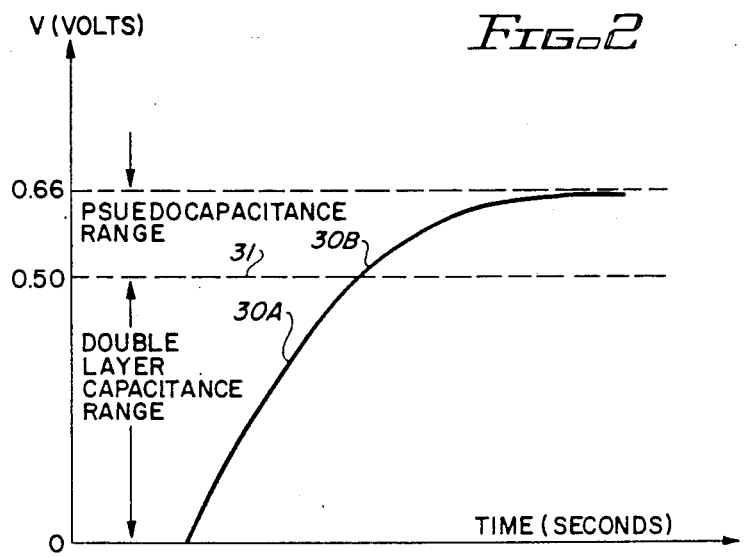
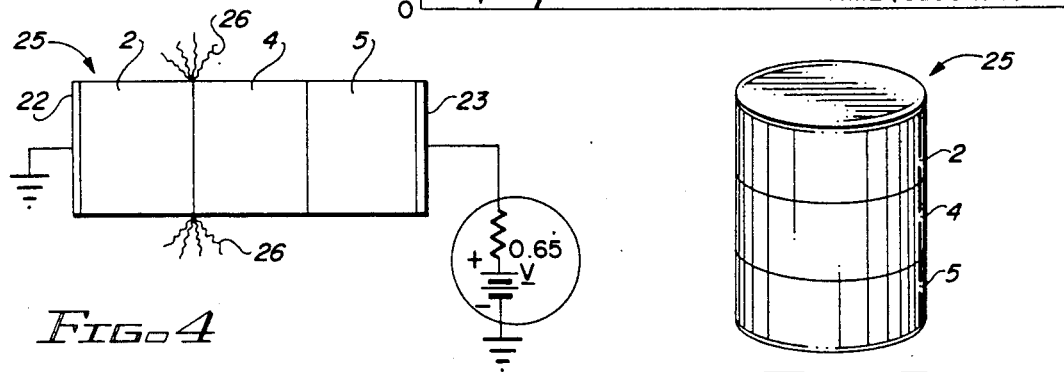
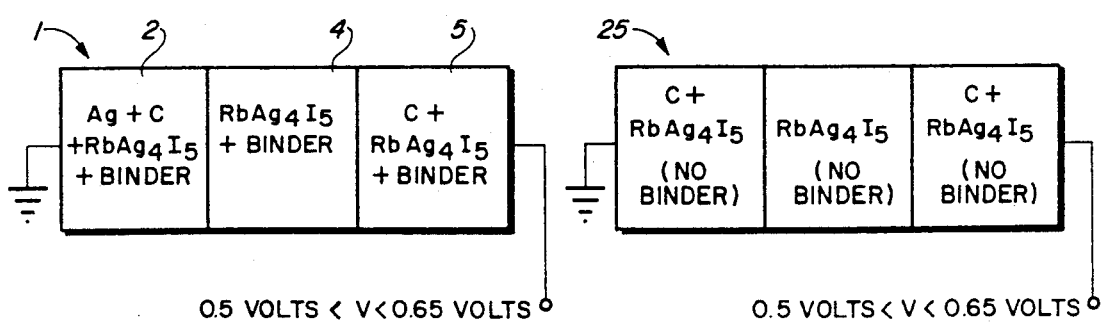

5,047,899

SOLID ELECTROLYTE CAPACITOR AND METHOD OF MAKING

BACKGROUND OF THE INVENTION

The invention relates to a highly reliable solid electrolyte capacitor and method of making, and more particularly to a solid electrolyte capacitor including an anode and cathode each composed of carbon and $RbAg_4I_5$ and a solid electrolyte composed of $RbAg_4I_5$, and also to a method of using the capacitor in a pseudocapacitance mode to increase energy storage without causing dendrite growth that would electrically short the anode of the capacitor to the cathode thereof.

Certain low voltage solid-state "electrochemical cells", perhaps more accurately referred to as "supercapacitors", are known and in some ways are advantageous compared to conventional batteries with respect to shelf-life stability, leak-free properties, and miniaturization. Such solid-state cells generally utilize silver as anode material and carbon capable of functioning as an electron receptor material for the cathode material. The solid electrolyte serves as an ionic conductor for the ionic part of the current within the solid-state cell. U.S. Pat. Nos. 3,701,685, 3,503,810, 3,443,997, 3,476,605, 3,647,549, 3,663,299, and 3,476,606 are generally indicative of the state of the art for such solid-state cells.

As indicated in "A Solid-State Energy Storage Device", published in "The Proceedings of the Power Sources Conference", No. 24, 1970, page 20, and as indicated in "A Solid-State Electrochemical Capacitor" by J. E. Oxley, published as Abstract No. 175 in a source unknown to applicant, of unknown date, the feasibility of constructing such a capacitor (hereinafter referred to as a "supercapacitor"), based on the "double layer capacitance" inherent in an electrode/solid electrolyte interface has been recognized. The first reference mentioned above describes a supercapacitor, on page 20, as one of the type under discussion charged to a voltage below 0.50 volts wherein silver is plated on silver already present in the anode during charging and a layer of electrons is formed on the surface of carbon contained in the cathode during the charging operation.

The second reference mentioned above describes the same supercapacitor cell, with the voltage being charged to levels in the range from 0.50 volts to 0.65 volts. The same structure in this case is referred to as a "pseudocapacitor" wherein more of the silver is plated onto the anode, and in the cathode a monolayer of iodine ions forms on the surface of carbon contained in the cathode material. This has the result of increasing the energy storage by a factor of approximately 5 over the energy storage in the same supercapacitor structure if no iodine is being plated onto the cathode. It also has been recognized that because of the absence of a separate relatively thick dielectric, the capacitances achievable can be several orders of magnitude greater than those structures of conventional electrolytic capacitors. The electrochemical capacitor disclosed in the above references uses the highly conducting solid electrolyte $RbAg_4I_5$. The anode of the basic cell system is composed of silver/$RbAg_4I_5$/carbon. The silver in the anode behaves as an electrode with very high capacitance, because the overvoltage necessary to plate silver on silver is very low. At potentials between 0.50 volts and 0.66 volts, the $RbAg_4I_5$ is oxidized to form a monolayer of iodine at the carbon/electrolyte interface in the electrolyte contained in the cathode.

At applied potentials below 0.50 volts, the charge is stored as electrons on the surface of the carbon of the cathode. When a potential in the above range is imposed on the solid-state cell, the current decays to zero as the required activity of iodine is established at the carbon/electrolyte surface. This interface, when a voltage in the range of 0.50 volts to 0.65 volts is "pseudocapacitance" region of the solid-state cell's capacitance characteristic. At potentials greater than 0.66 volts, the electrolyte is decomposed. When the cell is charged into the pseudocapacitance region, the total energy stored in the solid-state cell increases about 5 times over than of the double layer region of a double layer capacitance.

Before describing the present invention, it will be helpful to better understand the details of the closest prior art. In the prior art structure shown in FIG. 1, capacitor 1 has an anode 2 composed of activated carbon, silver and $RbAg_4I_5$. Anode 2 is connected by a conductor 3 to a negative voltage. Anode 2 abuts a solid dielectric 4 composed of pure $RbAg_4I_5$. The opposite face of solid electrolyte 4 contacts a cathode 5 composed of activated carbon and $RbAg_4I_5$. In prior art capacitor 1, the material of anode 2, solid electrolyte 4, and cathode 5 all include approximately one to two percent uniformly distributed LEXAN plastic material which serves as a binder for the particles of carbon and $RbAg_4I_5$ of which capacitor 1 is composed. Capacitor 1 of FIG. 1 is referred to as a "polar" structure because the anode and cathode compositions are not identical.

A problem with use of a plastic binder such as LEXAN in capacitor 1 is that it appears to encourage growth of silver dendrites from the anode to the cathode. FIG. 1A illustrates growth of such silver dendrites, which cause capacitor failure by short circuiting the anode and the cathode together.

If a constant charging current is supplied into positive cathode conductor 6, the voltage across capacitor 1 has the characteristic shown in segment 30A of FIG. 2. The voltage rises as indicated by segment 30A up to 0.50 volts. In the past, a number of workers have charged capacitor 1 to a voltage greater than 0.50 volts, thus adding the pseudocapacitor function. Segment 30A designates what is referred to herein as the "double layer" operating region of capacitor 1 and segment 30B is referred to herein as the "pseudocapacitor" operating region.

The charging circuit of capacitor 1 includes silver ions ($Ag^+$) flowing in the direction of arrow 7 from $RbAg_4I_5$ electrolyte layer 4 to anode layer 2. The charging current also includes electrons ($e^-$) flowing in the direction of arrow 8 from electrolyte 4 to cathode 5. A monolayer of such electrons are thought to become "plated" on activated carbon surface areas such as 15, possibly with a several angstrom gap maintained by molecular repulsive forces. The capacitance produced by the above mechanism is indicated by capacitor 19 in the schematic diagram of FIG. 3A.

In FIG. 3, numeral 1A designates a schematic equivalent diagram of the capacitance of the supercapacitor 1 shown in FIG. 1. Capacitor 19 represents the "double layer capacitance" and capacitor 20 designates the "pseudocapacitance". Approximately eighty percent of the energy storage capacity of capacitor 1 is in the "pseudocapacitance" range 30B of FIG. 2 when capacitor 1 is charged to a voltage of approximately 0.65 volts and twenty percent is in the "double layer" region 30A of FIG. 2 when capacitor 1 is charged to 0.50 volts. In the pseudocapacitance range, charge storage is thought to be due to accumulation of iodine on carbon of cathode 5.

The LEXAN binders mentioned above are thought to produce grains or growth paths in capacitor 1, particularly in $RbAg_4I_5$ of electrolyte 4, which encourage growth of the above-mentioned silver dendrites. Such silver dendrites, illustrated by numeral 21 in FIG. 1A, may result in the primary failure mechanism of the prior art cell of FIG. 1. a rechargeable cell that 1) can be completely discharged thousands of times, 2) is capable of operating reliably between $-65$ degrees Centigrade and $+160$ degrees Centigrade or higher, and 3) is highly reliable, with long lifetimes despite conditions of high temperatures and numerous repeated temperature cycles.

SUMMARY OF THE INVENTION

Accordingly, it is an object of the invention to provide an improved solid-state "supercapacitor" or "pseudocapacitor" cell which can be deeply discharged many times, and has a very long lifetime at both high and low temperatures.

It is another object of the invention to provide a practical method for making such a supercapacitor cell.

It is another object of the invention to provide a supercapacitor or a pseudocapacitor structure which avoids failure due to growth of silver dendrites.

It is another object of the invention to provide a technique for storing substantially more charge on a supercapacitor structure than has previously been achieved.

It is another object of the invention to provide a structure and technique for obtaining pseudocapacitor operation without providing silver distributed in the anode during manufacture of a pseudocapacitor structure.

It is another object of the invention to provide a structure and circuit to provide long, reliable stand-by retention of data in volatile semiconductor memory elements without transfer of data in volatile semiconductor memory cells to non-volatile memory cells.

It is another object of the invention to provide a supercapacitor which has more useful backup energy storage per unit volume than previously has been achieved.

Briefly described, and in accordance with one embodiment thereof, the invention provides a technique for supplying a backup voltage, including providing a solid-state electrochemical capacitor structure with a solid electrolyte composed of a layer of $RbAg_4I_5$, an anode composed of a layer of carbon and $RbAg_4I_5$ on a first surface of the electrolyte, and a cathode composed of a layer of carbon and $RbAg_4I_5$ on a second surface of the electrolyte. A current is supplied to charge up the cathode of the capacitor structure to a voltage in the range from 0.50 volts to 0.66 volts to cause storage of charge in the capacitor structure in both a double layer capacitance mode and a pseudo capacitance mode. The charged up capacitor is used to supply a backup voltage to a CMOS memory. The capacitor structure is made by compressing the electrolyte, the anode, and the cathode together to produce molecular bonding without binder material, using compression forces of more than approximately eighty thousand psi or more. Refractory metal or carbon contacts couple the anode and cathode to a charging circuit. The capacitor structure includes silver plated on an interface between the electrolyte and the anode, whereby silver is substantially depleted from the electrolyte, preventing growth of dendrites which cause failure of the capacitor structure. During manufacture, the capacitor structure is repeatedly charged to a voltage in the range of 0.50 volts to 0.66 volts, thereby causing peripheral dendrites to form on an outside edge of the capacitor structure at an interface between the anode and the electrolyte. The dendrites then are removed. A plurality of such capacitor structures are connected in series to produce a desired backup voltage level. The method of making the capacitor structure includes forming a first powder mixture of carbon and $RbAg_4I_5$, and a second powder mixture of $RbAg_4I_5$. A first amount of the first powder mixture is placed in a die and compressed in the die to form an anode layer. A second amount of the second powder mixture is placed in the die in the anode layer and compressed in the die to form an electrolyte layer on the anode layer. A third amount of the first powder mixture is placed in the die on the electrolyte layer and compressed in the die to form a cathode layer on the electrolyte layer. The anode, electrolyte, and cathode layers then are compressed together in the die by applying compressive force of more than approximately eighty thousand pounds per square inch to form a solid pellet. First and second refractory metal contacts then are electrically connected to surfaces of the anode layer and cathode layer, respectively.

BRIEF DESCRIPTION OF THE DRAWINGS

FIG. 1 is a diagram of a prior art supercapacitor.

FIG. 1A is a diagram that illustrates dendrite growth and the way such dendrites cause failure of prior solid-state supercapacitor structures.

FIG. 2 is a graph useful in describing two modes of operating the prior art capacitor of FIG. 1.

FIG. 3 is a schematic diagram showing an equivalent circuit for the structure of FIG. 1 operated in accordance with FIG. 2.

FIG. 4 is a diagram of the supercapacitor of the present invention before removal of peripheral dendrites.

FIG. 5 is a perspective view of a supercapacitor of the present invention.

FIG. 7 is a diagram useful in comparing the supercapacitor of the present invention with the prior art supercapacitor of FIG. 1.

DETAILED DESCRIPTION OF THE PREFERRED EMBODIMENTS OF THE INVENTION

Figure 6:
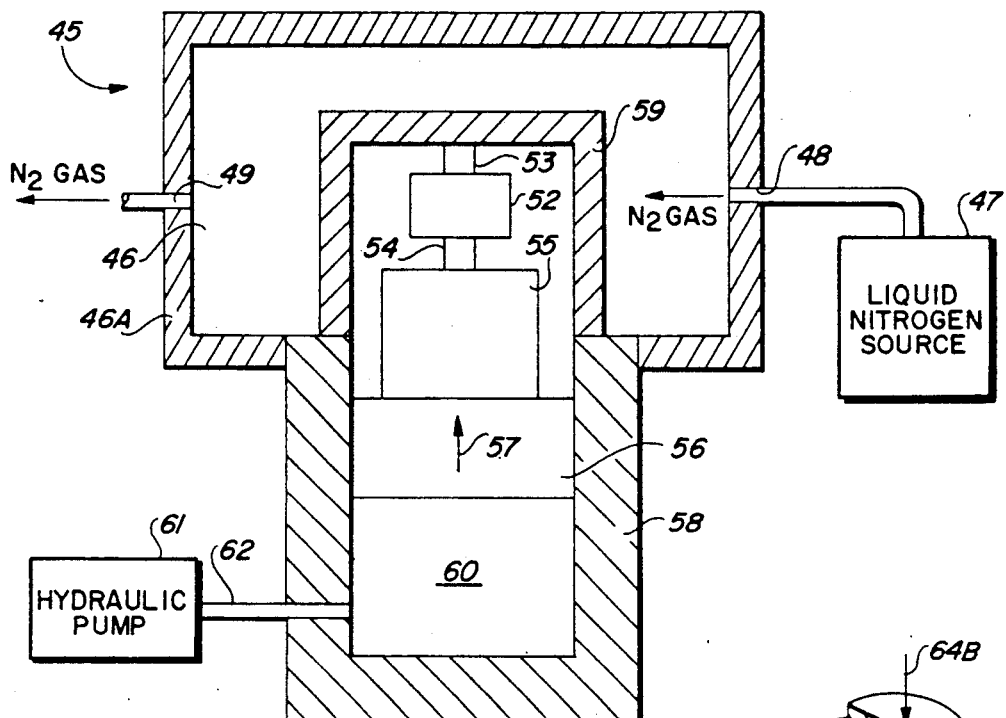
FIG. 6 is a diagram of an apparatus used in making the supercapacitor of FIG. 4.

Referring to FIG. 4, an initially nonpolar "supercapacitor" 25, made in accordance with the present invention, is referred to as "non-polar" because anode 2 and cathode 5 are of identical composition. Supercapacitor 25, hereinafter referred to as pseudocapacitor 25, includes no binders such as the LEXAN used in prior art capacitor 1 of FIG. 1. Both anode 2 and cathode 5 are composed of activated carbon and $RbAg_4I_5$, and are formed by very high pressure compression, of the order of a 80,000 pounds per square inch. It is thought that the growth of dendrites 26 eventually adjusts composition of the cell by depleting silver ion concentration in solid electrolyte 4. When the dendrites thus formed are removed by brushing them away, no further failure mechanism due to dendrite growth can occur because of the depleted silver ion concentration in electrolyte layer 4. Consequently, a very temperature-stable, long life pseudocapacitor cell is obtained. It has been found that pseudocapacitor 25 can be discharged many thousands of times without affecting reliability or performance thereof. (Dendrites probably also grow internally, but as long as they do not extend from the anode to the cathode, they apparently do not effect the reliability or performance of pseudocapacitor 25.)

The manner in which pseudocapacitor 25 operates as a capacitance in the double layer mode and in the pseudocapacitance mode is the same as described in the above-mentioned Oxley references. However, for an initially non-polar structure, the prior art discloses operating only in the double layer region 30A of the curve of FIG. 2. I consulted with Mr. Oxley, and he told me that this structure described in his articles could not be operated in the pseudocapacitance mode, perhaps because the non-polar structure of the prior art supercapacitor structure which is identical to that of pseudocapacitor 25 has only half of the capacitance of a similar polar supercapacitor structure, and perhaps also because charging operation would be inefficient with no distributed silver in the anode for silver ions from the electrolyte layer 4 to plate onto.

In accordance with my invention, I nevertheless attempted to operate the structure in the pseudocapacitance mode by charging it up to voltages close to 0.65 volts, and discovered that it causes peripheral dendrite growth which depletes silver to the point where there is none left for producing internal dendrite growth sufficient to cause device failure due to cathode-to-anode shorting. The external dendrites 26 can be removed by brushing. I believe that the peripheral surface of the pseudocapacitor 25 probably enhances growth of peripheral dendrites substantially faster than internal dendrites, causing depletion of silver before any internal dendrites grow far enough from the anode to produce an electrical short to the cathode. (The capacitance of nonpolar capacitor 25 operated in the double layer region is one-half that of a polar cell because the anode and cathode capacitive layers are coupled in series).

FIG. 7 illustrates the distinguishing features of the present invention. The pseudocapacitor 25 of the present invention contains no silver particles in anode 2 or cathode 5. The closest prior art pseudocapacitor 1 includes silver particles in the anode material. Pseudocapacitor 25 of the present invention charges cathode 5 to voltages that encourage peripheral dendrites to grow, to thereby deplete silver available in electrolyte layer 2 and prevent future growth of internal dendrites that lead to short circuiting and failure of the capacitor. In contrast, pseudocapacitor 1 of the prior art avoids using heavy currents with the structure to voltages which cause dendrites to grow because dendrites are regarded as the prime failure mechanism of such structures.

Finally, no binders are used in electrolyte layer 4 of the pseudocapacitor 25 of the present invention. In the described embodiment, no binders are used in the anode layer 2 or the cathode layer 5 either, although in the future, with an increased proportion of carbon in anode 2 and cathode 5, some binders may be used, but it is expected that binders will not be used in electrolyte layer 4. In contrast, supercapacitor 1 of the closest prior art uses binders in all three layers 2, 4, and 5.

The method of manufacturing prototypes of pseudocapacitor 25 of FIG. 5 is as follows.

EXAMPLE 1

Figure 6A:
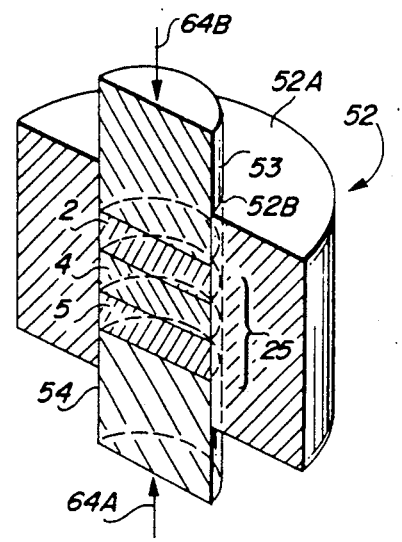
FIG. 6A is a partial section diagram of the die and compression members used to make the supercapacitor of FIG. 4.

Using the fabrication apparatus 45 of FIGS. 6 and 6A, nitrogen gas from source 47 passes inside a sealed chamber 46, so that an oxygen-free, moisture-free environment is provided for manufacture of the cell. It should be noted that if moisture is present in the electrolyte powder or the anode and cathode powder material, it will cause the pseudocapacitor structure formed to self-discharge more rapidly. Nitrogen gas enters chamber 46 through inlet 48, and is exhausted through exhaust port 49. Although not shown in FIG. 6, suitable manipulation means are provided to allow complete manufacture of the basic cell of pseudocapacitor 25 in the oxygen-free, moisture-free chamber 46 of FIG. 6. FIG. 6 schematically shows a workable manufacturing arrangement in which a U-shaped abutment member 59 extends into chamber 46, and is rigidly supported in fixed relationship to a hydraulic cylinder 58 having a hydraulically moveable piston 56 therein. A pedestal 55 on piston 56 supports a cylindrical hardened die 52 having two moveable cylindrical compression or thrust members 53 and 54 between which the anode layer 2, electrolyte layer 4, and cathode layer 5 are compressed, as best seen in FIG. 6A. A hydraulic pump 61 injects pressurized hydraulic fluid in the lower part 60 of hydraulic cylinder 58, producing upward force that moves piston 56 and pedestal 55 upward in the direction of arrow 57. U-shaped member 59 provides a downward counterforce 64B in opposition to the upward force 64A produced by pedestal 55 on the compression member 54. Cylindrical steel sleeve 52A is manufactured, which is formed of oil hardened tool steel to very close tolerance of about 0.001 inches. Compression members 53 and 54 also are formed of precision machined oil hardened tool steel. Using moderate pressure applied by hand within chamber 46, compression members 53 and 54 can be forced together to preform powder material into the layers 5, 4, and 2.

Compression members 53 and 54 fit so precisely into a cylindrical opening through cylindrical sleeve 52A that the seal is nearly airtight and essentially hermetic. Suitable apparatus, including airtight glove-like manipulation members by means of which an operator standing outside of chamber 46 can reach inside it and manipulate various tools, controls, and the like, can be utilized to prepare the electrolyte powder, and also the anode and cathode electrolyte/carbon powder mixtures, grind them into particles, remelt them, regrind them, pour layers 5, 4, and 2 individually into the opening 52B of die 52, manipulate compression members 53 and 54 to compress layers 5, 4, and 2 as subsequently described. Finally, a high compressive force, for example, eighty thousand pounds per square inch, is applied in chamber 46 on the combined preformed layers 2, 4, and 5 to produce a solid, unitary pseudocapacitor cell structure.

Figure 10A:
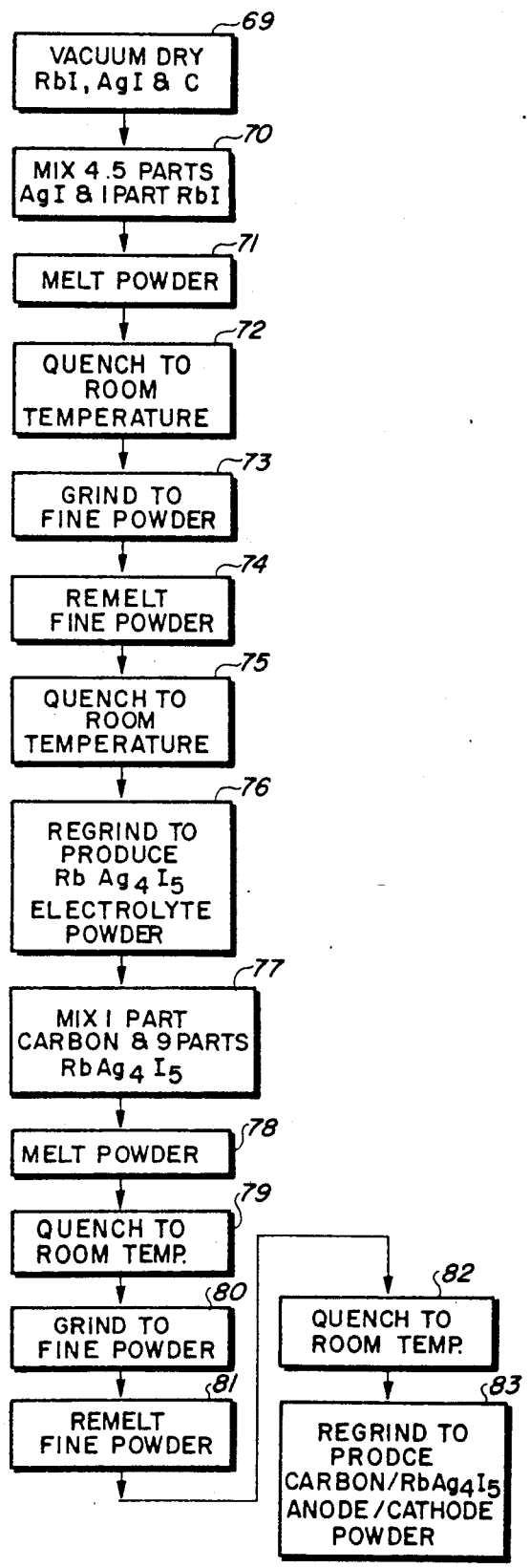
FIGS. 10A and 10B are flow diagrams of the method of making the supercapacitor of FIG. 4.
Figure 10B:
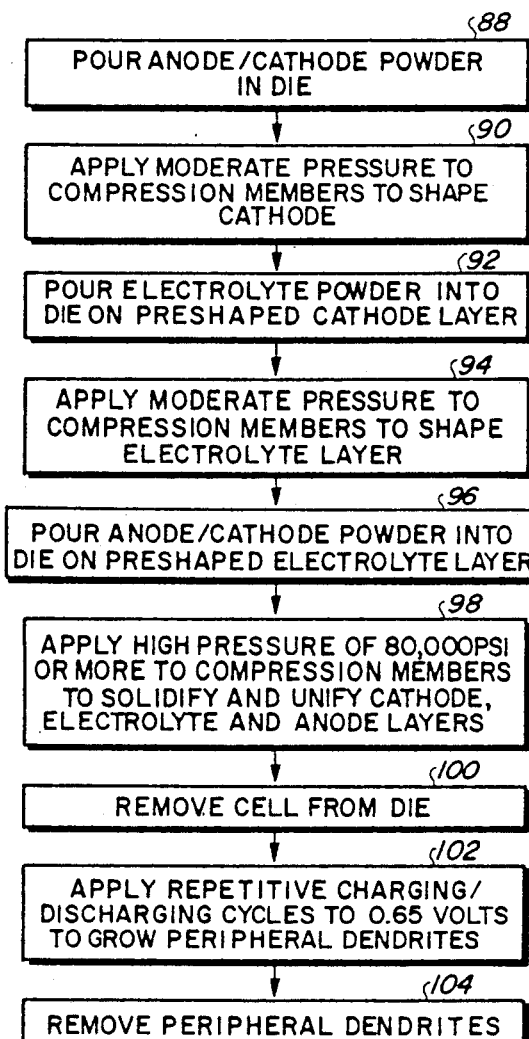

The following steps, referred to in the flowcharts of FIGS. 10A and 10B, preferably are performed in the oxygen-free, moisture-free environment of chamber 46.

As indicated in block 69 of FIG. 10A, RbI, AgI and activated carbon are vacuum dried and simultaneously heated within chamber 46 to remove all moisture. The RbI and the AgI then are mixed in the ratio of 4.5 parts of AgI to 1 part of RbI to form electrolyte powder, as indicated in block 70. As indicated in block 71, the electrolyte powder is heated in chamber 46 on a hot plate to roughly 300 degrees Centigrade (the melting point of the electrolyte powder being approximately 232 degrees Centigrade). The melted electrolyte then is cooled or quenched rapidly by pouring it on a stainless steel plate, as indicated by block 72. The resulting solidified electrolyte material then is broken and ground in chamber 46 with a mortar and pestle, as indicated in block 73 of FIG. 10A. The ground up electrolyte powder then is remelted in chamber 46 in the manner indicated above, as indicated in block 74 of FIG. 10A, and then is quenched as indicated in block 75, and reground to obtain a more complete reaction, as indicated in block 76 to produce the final electrolyte powder material.

In order to make carbon/$RbAg_4I_5$ anode 2 and the identical carbon/$RbAg_4I_5$ cathode 5 of pseudocapacitor 25, 9 parts of the ground $RbAg_4I_5$ electrolyte material are mixed with one part of activated carbon, as indicated in block 77. This mixture is melted, as indicated in block 78, in the manner described above, quenched as indicated in block 79, broken, and then ground using the mortar and pestle (all within chamber 46), as indicated in block 80. The resulting powder then is remelted, as indicated in block 81, again quenched, as indicated in block 82, broken and reground, as indicated in block 83 to form the carbon/$RbAg_4I_5$ anode material and cathode material.

After both the electrolyte powder and the anode/cathode powder have been formed as indicated in FIG. 10A, the supercapacitor structure 25 is formed using the apparatus of FIG. 6 in accordance with the process of FIG. 10B. The first step, as indicated in block 88 of FIG. 10B, is to pour a quantity of the anode/cathode powder into die 52, as indicated in block 88. Moderate pressure then is applied to force compression members 53 and 54 together. In the manufacture of the described prototypes, this is accomplished by hand, pressing the two thrust members 53 and 54 together and twisting them to form a uniform cathode layer 5 within die 52. Then the upper compression member 53 is removed from die 52. Next, as indicated in block 92 of FIG. 10B, a quantity of pure electrolyte powder is measured into die 52, forming electrolyte layer 4 on already preformed cathode layer 5. Compression member 53 is reinserted into opening 52B, and manipulated to press layer 4 against layer 5 and provide a uniform layer thickness. This step is indicated in block 94 of FIG. 10B.

Next, as indicated in block 96 of FIG. 10B, after compression member 53 again has been removed from die 52, a quantity of the carbon-$RbAg_4I_5$ powder mixture is poured into die 52 on top of preformed electrolyte layer 5. Compression member 53 again is repositioned in die 52. Opposed forces again are applied to compression members 53 and 54 to compress and preform anode layer 2 on preformed electrolyte layer 4, to thereby preform the entire pseudocapacitor cell structure 25. Then, as indicated in block 98, die 52 with pseudocapacitor 25 therein, is positioned on pedestal 55 as shown in FIG. 6, and hydraulic pump 61 is actuated to produce upward compression forces of eighty thousand pounds or more per square inch on compression member 54. This condition is maintained for several minutes, and solidifies the entire preformed supercapacitor structure 25. The next step in making the basic cell is removal of the solidified cell from die 52, as indicated in block 100 of FIG. 10B. The cell 25 then is repetitively charged and discharged, causing dendrites 26 to grow peripherally. Dendrites 26 then are brushed away, as indicated in block 102. It should be noted that in prototypes of supercapacitor cell structure 25 made to date, the diameter of the anode layer 2, electrolyte layer 4, and cathode layer 5 is 0.375 inches, although the same basic method could be utilized to make cells of any diameter. In the prototype cells made to date, the thickness of the cathode layer 5 is approximately 0.1 inches, the thickness of the electrolyte layer 4 is 0.1 inches, and the thickness of the anode layer 2 is approximately 0.1 inches. However, I expect that it would be practical to make the thicknesses in the range from 0.05 inches to 0.5 inches, depending on various consideration such as length of possible internal dendrites and the amount of internal cell resistance desired.

This pressure is sufficiently great that a need for binder material such as LEXAN is avoided. A durable pseudocapacitor 25 is thereby formed without any internal grains or paths for internal dendrite growth.

Anode 2 and cathode 5A are electrically contacted by refractory metal (e.g., tantalum, titanium, or molybdenum) electrodes 22 and 23 (See FIG. 4) to form the completed capacitor structure. (Pure carbon or graphite also could be used.) During the charging and discharging cycles, cathode 5 was charged up to 0.65 volts relative to anode 2. It was found that silver plates onto the anode-electrolyte interface, making the cell polar. In the described example, when the pseudocapacitor 25 was charged with a constant charging current of 0.010 amperes, at voltages above 0.50 volts and less than 0.65 volts, a coat of silver mysteriously appeared on the cylindrical peripheral wall surface of anode layer 2. Even more mysteriously, after approximately two more hours of charging, the silver that has plated out migrates back into the anode structure and disappears. Then pseudocapacitor 25 was subjected to repeated charging and discharging cycles, as indicated in block 102 of FIG. 10B. This caused dendrites to initially grow on the outer edge surface of the cylindrical body of pseudocapacitor 25 at the junction between anode layer 2 and electrolyte layer 4, as indicated by numerals 26 in FIG. 4. Such dendrites later are brushed off, leaving a dendrite-free structure.

The migration of silver from solid electrolyte 4 to anode 2 probably accomplishes the same thing as the prior art technique of adding silver to the anode to make the capacitor polar. The migration of silver occurs only if the capacitor is charged to a voltage above 0.50 volts. The resulting depletion of silver from the solid electrolyte 4 as a result of the plating and dendrite growth prevents further dendrite growth which results in electrical shorting of the anode to the cathode, the main failure mechanism of prior art capacitor cells of this general type.

Figure 8:
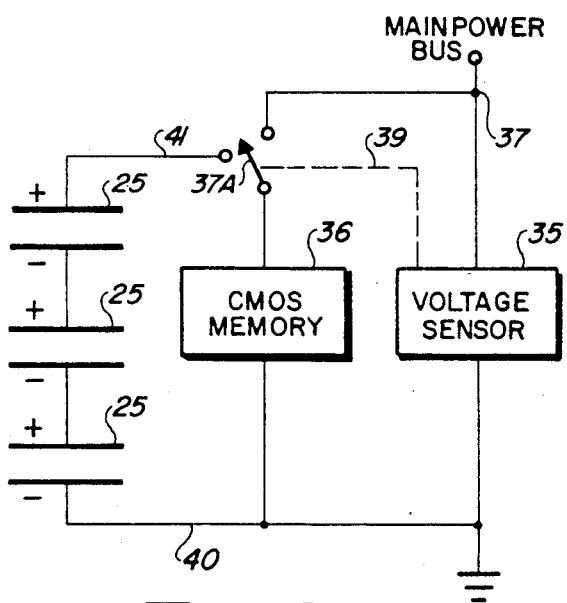
FIG. 8 is a diagram of a stack of the supercapacitors of the invention connected to provide a backup battery for a CMOS memory.
Figure 9:
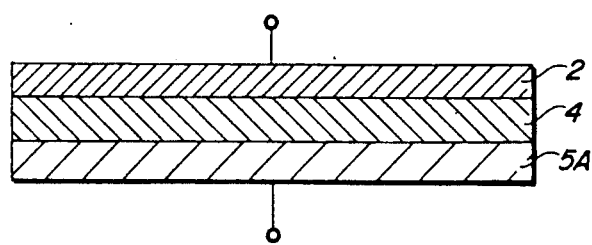
FIG. 9 is a diagram of an embodiment of the invention designed to provide a large discharge current.

FIG. 8 shows an application of a series-connected group of pseudocapacitors 25 of the present invention, each operated in its pseudocapacitance range. Individual supercapacitor cells 25 are connected in series as shown between conductors 40 and 41 to form a standby power supply for a CMOS memory 36 or other electronic circuitry. CMOS circuitry 36 is coupled by switch 37A between the main power bus 37 and ground conductor 40. A voltage sensor circuit 35 monitors the voltage on main power bus 37, and generates a switch control signal 39 if the voltage on main power bus 37 falls below a preset threshold, turning on switch 37A, so that the backup voltage on conductor 41 is connected to main power bus 37, providing backup power for CMOS memory 36. The use of the pseudocapacitors 25 as a backup energy source permits volatile memory storage elements in circuitry 36 to retain their data despite the loss of main power from bus 3 by closing switch 37A and supplying stand-by power from pseudocapacitors 25 without the need to provide corresponding non-volatile memory elements and circuitry and a procedure for transferring data from the volatile to the non-volatile memory elements. For example, some presently available 64 kilobit CMOS RAMs can retain data with a stand-by current of only ten nanoamperes at room temperature. This would allow a pseudocapacitor structure of the type shown in FIG. 8 to maintain data in such a CMOS memory at room temperature for roughly twenty years using pseudocapacitors of the type which are described herein.

In accordance with the present invention, all of the supercapacitor cells 25 are charged up to voltages between 0.50 volts and 0.66 volts, causing them to store most of their energy in the pseudocapacitance mode of segment 30B of FIG. 2.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, the described embodiments of the invention utilize ninety percent $RbAg_4I_5$ by weight and ten percent carbon for the anode and cathode materials, which are the proportions taught by the literature. Further experimentation in which the proportion of carbon may be increased should yield a higher density of energy storage because the amount of carbon should be generally proportional to the amount of charge that can be stored in the supercapacitor structure. This may lead to increased difficulty in keeping the anode and cathode powder particles adherent to each other to form solid anode and cathode structures. This in turn may lead to the need to utilize higher compressive pressures in manufacture of the supercapacitor structure, and may also lead to the need to use small amounts of binder material, such as LEXAN, in the anode material and cathode material, and possibly in the electrolyte layer. Although in the described embodiment the anode, electrolyte, and cathode disks are formed together in the same chamber, before the high pressure step is performed, it might be desirable to preform the three disks separately to increase the purity of each, and then place the preformed disks in the high compression chamber for the final high pressure compression step. Other techniques for forming the $RbAg_4I_5$ are known in the prior art. The constituent components can be dissolved in the solvent such as acetone or pyridine, causing the $RbAg_4I_5$ to be formed. The remaining solution is removed and evaporated, but the resulting $RbAg_4I_5$ has some silver iodide and other high resistance chemicals therein, and does not function as efficiently as an electrolyte that was made by the above-described process. The electrolyte layer may be made thinner than in the described embodiment of the invention, as long as any internal dendrites that may have grown during depletion of silver from electrolyte layer 4 do not extend therethrough. The anode and cathode also quite possibly could be made thinner.

What is claimed is:

1. A method of storing a large amount of backup energy, comprising the steps of:
   (a) providing a capacitor structure including a solid electrolyte composed of a layer of $RbAg_4I_5$, an anode composed of a layer of carbon and $RbAg_4I_5$ adjoining a first surface of the electrolyte, and a cathode composed of a layer of carbon and $RbAg_4I_5$ adjoining a second surface of the electrolyte;
   (b) supplying a current to charge up the anode of the capacitor structure to a voltage in the range from 0.50 volts to 0.66 volts to cause storage of charge in the capacitor structure in both a double layer capacitance mode and a pseudocapacitance mode and to cause silver to deposit in the anode.

2. The method of claim 1 including supplying the backup voltage to a CMOS memory.

3. A capacitor structure for storing backup energy, comprising in combination:
   (a) a layer of solid electrolyte material composed of $RbAg_4I_5$;
   (b) a layer of anode material composed of carbon and $RbAg_4I_5$ and adjoining a first surface of the electrolyte material, and a layer of cathode material also composed of carbon and $RbAg_4I_5$ and adjoining a second surface of the electrolyte material parallel to the first surface;
   (c) means for charging the capacitor structure to produce a voltage of 0.50 volts to 0.66 volts between the anode material and the cathode material, to thereby cause storage of charge in a double layer mode and also in a pseudocapacitance mode and to cause silver to deposit in the anode.

4. The capacitor structure of claim 3 wherein the electrolyte material, the anode material, and the cathode material are compressed together such that solid bonding of the anode material, cathode material, and electrolyte is attained without use of binder material.

5. The capacitor structure of claim 4 wherein the molecular bonding is produced by compression forces of greater than twenty thousand pounds per square inch.

6. The capacitor structure of claim 5 wherein the thickness of the layer of anode material, the layer of electrolyte material, and the layer of cathode material each are approximately 50 mils.

7. The capacitor structure of claim 3 wherein the anode material, cathode material, and electrolyte material are in the form of relatively thin layers.

8. The capacitor structure of claim 3 wherein the anode material, cathode material, and electrolyte material are in the form of relatively thick layers.

9. The capacitor structure of claim 3 including a first refractory metal contact coupling an outer surface of the anode material to the charging means, and a second refractory metal contact coupling an outer surface of the cathode material to the charging means.

10. The capacitor structure of claim 9 wherein the refractory metal is composed of material from the group consisting of titanium, tantalum, and molybdenum.

11. The capacitor structure of claim 3 including a first electrical contact coupling an outer surface of the anode material to the charging means, and a second electrical contact coupling an outer surface of the cathode material to the charging means.

12. The capacitor structure of claim 11 wherein the first and second electrical contacts are composed of material from the group consisting of carbon and graphite.

13. The capacitor structure of claim 3 including silver plated on an interface between the electrolyte material and the anode material, whereby silver is substantially depleted from the electrolyte material, preventing further growth of dendrites which cause failure of the capacitor structure.

14. The capacitor structure of claim 13 wherein the layer anode material is formed by charging the anode material to a voltage in the range of 0.50 volts to 0.66 volts, causing dendrites to form on an outside edge of the capacitor structure at an interface between the anode material and the electrolyte material and then removing the dendrites.

15. The capacitor structure of claim 3 including encapsulation hermetically sealing the layer of anode material, the layer of cathode material, and the layer of electrolyte material from outside environment.

16. The capacitor structure of claim 3 including a plurality of capacitor structures each including a layer of anode material, a layer of cathode material, and a layer of electrolyte material, connected in series, the charging means charging each of the capacitor structures to an anode-to-cathode voltage difference of 0.50 volts to 0.65 volts.

17. A method of making a capacitor structure, comprising the steps of:
 (a) forming a first powder mixture of carbon and $RbAg_4I_5$, and forming a second powder mixture of $RbAg_4I_5$;
 (b) placing a first amount of the first powder mixture in a die;
 (c) compressing the first amount in the die to form an anode layer;
 (d) placing a second amount of the second powder mixture in the die in the anode layer;
 (e) compressing the second amount against the anode layer in the die to form an electrolyte layer on the anode layer;
 (f) placing a third amount of the first powder mixture in the die on the electrolyte layer;
 (g) compressing the third amount against the electrolyte layer in the die to form a cathode layer on the electrolyte layer;
 (h) compressing the anode, electrolyte, and cathode layers together in the die by applying compressive pressure greater than twenty thousand pounds per square inch to form a solid pellet; and
 (i) forming first and second refractory metal contacts that adjoin outer surfaces of the anode layer and cathode layer, respectively.

18. The method of claim 17 including forming the first powder mixture by mixing 1 part of carbon with 9 equal parts of $RbAg_4I_5$.

19. The method of claim 17 wherein the compressing of steps (c), (e), and (g) includes applying compressive forces of greater than twenty thousand pounds per square inch.

20. The method of claim 17 wherein steps (a) through (i) are performed in an oxygen-free, moisture-free environment.

21. The method of claim 17 wherein the first powder mixture is formed by melting the carbon and $RbAg_4I_5$, cooling the melt, and grinding it into particles of about one mil in size.

22. The method of claim 21 wherein the second powder mixture is formed by melting the $RbAg_4I_5$, cooling the melt, and grinding it into particles of about one mil in size.

23. The method of claim 17 including causing a DC charging current to flow into the cathode layer to charge the cathode layer of the capacitor structure to a voltage above 0.50 volts relative to the anode layer for a sufficiently long time to cause silver to form in the anode layer.

24. The method of claim 23 including repeatedly discharging the cathode layer and then recharging the cathode layer to voltages in the range from 0.50 volts to 0.65 volts for a sufficiently long time to cause peripheral silver dendrites to grow around an interface between the anode layer and the electrolyte layer.

25. The method of claim 24 including continuing the discharging and recharging until peripheral silver dendrite growth has essentially stopped and then removing the dendrites.

26. A method of supplying standby power for a semiconductor memory, comprising the steps of:
 (a) providing a capacitor structure including a solid electrolyte composed of a layer of $RbAg_4I_5$, an anode composed of a layer of carbon and $RbAg_4I_5$ adjoining a first surface of the electrolyte, and a cathode composed of a layer of carbon and $RbAg_4I_5$ adjoining a second surface of the electrolyte;
 (b) supplying a current to charge up the anode of the capacitor structure to a voltage in the range from 0.50 volts to 0.65 volts to cause storage of charge in the capacitor structure in both a double layer capacitance mode and a pseudocapacitance mode;
 (c) sensing a condition in which the semiconductor memory requires application of standby power thereto;
 (d) electrically connecting electrodes of the capacitor structure to power terminals of the CMOS memory.

* * * * *